United States Patent [19]
Church

[11] Patent Number: 5,937,793
[45] Date of Patent: Aug. 17, 1999

[54] FLOORING SYSTEM FOR FARROWING PEN

[75] Inventor: Kenneth S. Church, Manitoba, Canada

[73] Assignee: Faroex Ltd., Gimli, Canada

[21] Appl. No.: 09/110,649

[22] Filed: Jul. 7, 1998

Related U.S. Application Data

[63] Continuation-in-part of application No. 08/798,210, Feb. 10, 1997, abandoned.

[51] Int. Cl.$^6$ ........................................ A01K 1/00
[52] U.S. Cl. ............................................. 119/528
[58] Field of Search ................... 119/528, 529, 119/530, 480, 447; 52/2.24, 578, 588.1, 633, 660

[56] References Cited

U.S. PATENT DOCUMENTS

| | | | |
|---|---|---|---|
| 3,455,279 | 7/1969 | Krevit | 119/528 |
| 3,995,593 | 12/1976 | Bowser | 119/529 |
| 4,018,271 | 4/1977 | Jones et al. | 119/529 |
| 4,048,960 | 9/1977 | Barnidge et al. | 119/529 |
| 4,231,325 | 11/1980 | Parks | 52/660 |
| 5,157,890 | 10/1992 | Jines | 52/588.1 |
| 5,425,214 | 6/1995 | Truelove et al. | 52/578 |

FOREIGN PATENT DOCUMENTS

| | | |
|---|---|---|
| 396 881 | 3/1990 | European Pat. Off. . |
| 0 472 206A1 | 8/1991 | European Pat. Off. . |
| 3927462 A1 | 8/1989 | Germany . |
| 93 20 652 | 8/1993 | Germany . |
| WO95/18525 | 7/1995 | WIPO . |

OTHER PUBLICATIONS

Brochure—"Polygrate" (8 pages).
*Article in paper "Feld und Wald" No: 16 of Apr. 16, 1976.

Primary Examiner—Michael J. Carone
Assistant Examiner—Elizabeth Shaw
Attorney, Agent, or Firm—Adrian D. Battison; Murray E. Thrift

[57] ABSTRACT

Flooring for a farrowing crate particularly for pigs is formed of beams and support flanges which are manufactured of glass fiber reinforced resin so as to be electrically insulating. The beams span a pit for receiving manure. On top of the supporting structure is provided a flooring formed of a plurality of rectangular panels or tiles arranged side to side and edge to edge to form an array of the panels. An area under the sow is defined of pressure molded aluminum panels or extruded and welded aluminum bars and an area fully surrounding an island of aluminum panels is defined by panels of injection molded plastics which are again non-conductive. The steel structure of the farrowing crate is bolted to the plastics panels at positions forwardly and rearwardly of the island of aluminum panels. Thus the aluminum panels are electrically insulated by the plastic panels and the non-conductive support beams from any electrically conductive element within the farrowing crate to prevent galvanic corrosion of the aluminum panels. Where the aluminum beams are extruded they can be hollow to allow the passage of a cooling fluid to cool the sow. A heat pump is used to transfer the heat from the sow to the piglets on the plastic panels.

29 Claims, 10 Drawing Sheets

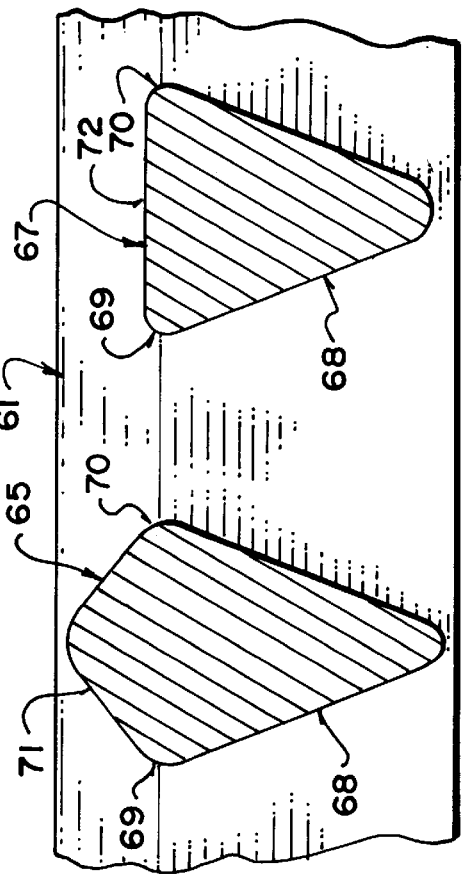
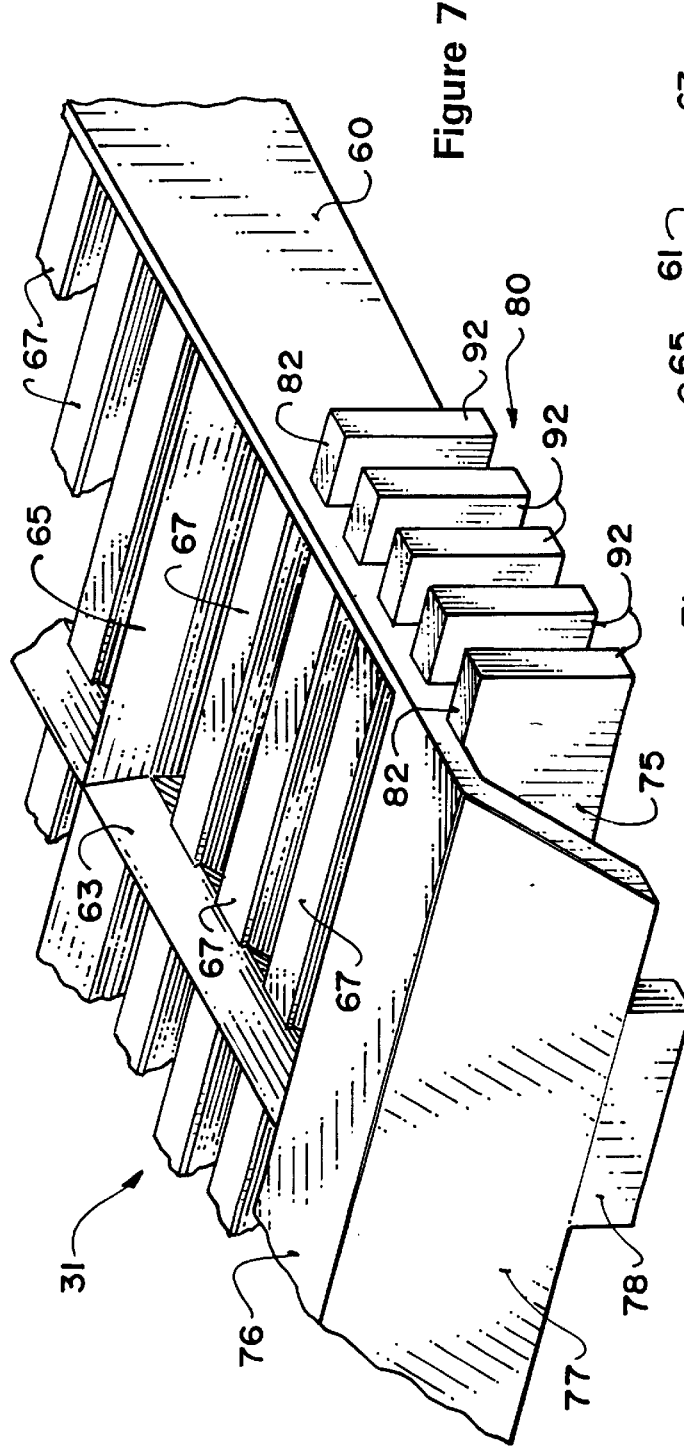

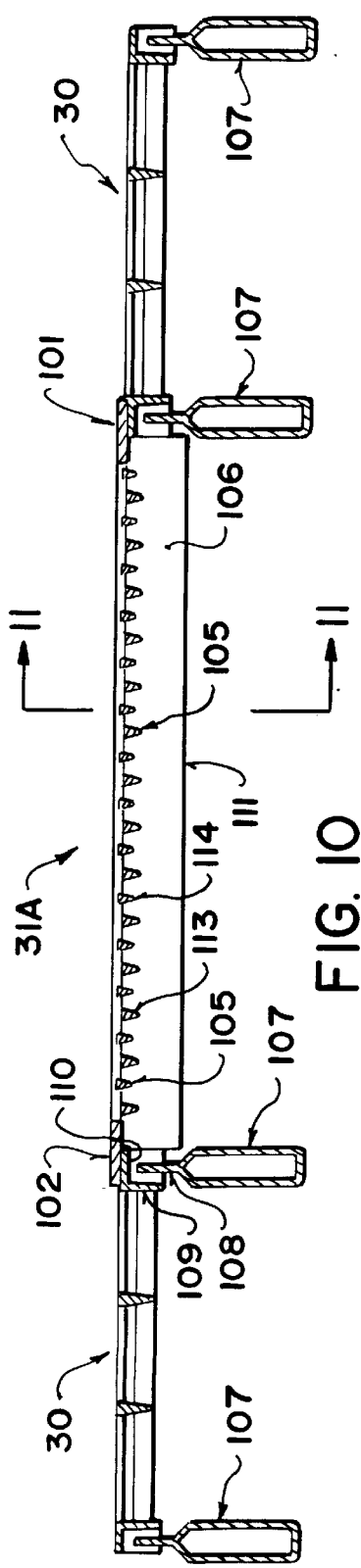
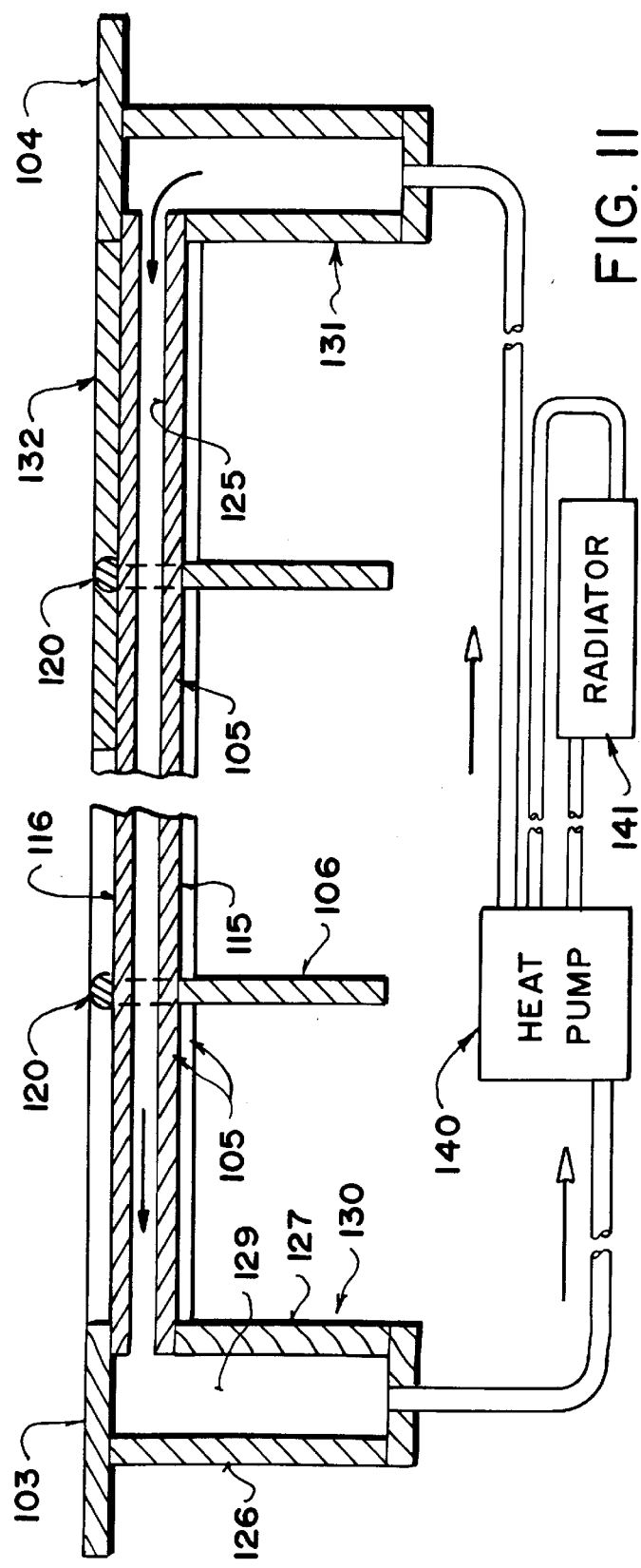
FIG. 10
FIG. 11

FLOORING SYSTEM FOR FARROWING PEN

This application is a continuation in part application of application Ser. No. 08/798,210 filed Feb. 10, 1997 and now abandoned in favour of this application.

This invention relates to a flooring system for use in a farrowing pen for animals and particularly for pigs.

BACKGROUND OF THE INVENTION

In the intensive raising of pigs, the sow at the time of birthing is moved to a farrowing pen which includes a farrowing crate which defines a central area in which the sow can lie and a two side creep areas in which the piglets can lie, move about and can move to the sow for accessing the nipples.

The farrowing crate generally includes a metal framed structure which confines the sow so as to prevent the sow from lying in the side areas and thus crushing the piglets. The crate and flooring system allows the sow to stand so that the sow can feed from a feeder located at a front of the crate on an outlet door. The crate is generally bolted to the flooring system or to the surrounding concrete structure so that it stands up from the floor and extends from the front to the rear of the pen.

Underneath the pen is provided a manure containment pit and over the pit is mounted a flooring structure on which the sow can lie and stand and on which the piglets can lie and move.

The farrowing pens are generally arranged side by side in a row with the front gate opening on to an alley way.

In recent years, the importance of a high level of sanitation in the production of pigs has been appreciated to avoid transfer of diseases from one litter to the next. The purpose of the pit and the supporting flooring system above the pit on which the animals stand is in order to provide improvements in hygiene so that the manure from the animals falls through the floor into the pit and is separated from the animals standing on the floor. The floor can then be cleaned to prevent bacteria, viruses and funguses from being harbored in the flooring and pen system.

This type of system using a pit was implemented in approximately the 1950s. The first type of flooring used for the purposes of extending across the pit and supporting the animals was in many cases a simple wooden flooring formed from a series of parallel slats. At around the same time, aluminum flooring was also used in the form of extruded elongate T-bars. The vertical web of the T-bar provided sufficient strength to enable this structure to span the length of the farrowing crate which is generally of the order of 7 feet. The T-bars had a horizontal upper surface and were mounted side-by-side so that the bars were arranged in spaced position with a slot or opening between the two adjacent T-bars allowing the manure to fall through for collection in the pit.

The aluminum T-bars had two disadvantages. Firstly, any electrical conduction between the aluminum T-bars and another conductive material generated a highly aggressive corrosion caused by galvanic action. In this corrosion, two dissimilar materials, such as the steel of the farrowing crate and the aluminum of the flooring, in conjunction with an electrolyte provided by the liquid manure provides a galvanic action rapidly corroding the aluminum T-bars. Galvanic corrosion is particularly pernicious in that it is generally invisible but degrades the material until it becomes brittle and fails, generally catastrophically, dumping the animals into the pit.

Secondly, the upper horizontal surface of the aluminum since it was extruded was linear and flat and thus was slippery so that the animals tended to have difficulty standing. Sows particularly are not agile and accordingly have difficulty rising from lying position. Any slipping of the feet can cause the sow to fall or to splay which can injure the sow and can crush many piglets. It is well known that the crushing of piglets is a significant problem and can dramatically reduce the efficiencies of pig production if significant numbers of the piglets are crushed.

Some attempts were made to overcome these problems. In regard to the galvanic corrosion, the T-bar slats were electrically insulated from the underlying concrete structures by providing an insulating plastic strip lying on top of the concrete and underneath the T-bar slat. However this attempt was generally unsuccessful because any electrical connection including through the steel crate, drinking devices or electrical devices over the life of the product, which is expected to be several years, caused such galvanic corrosion. Such electrical connection is difficult to avoid in the presence of the electrically conductive manure which can bridge insulators. Some attempts were made to reduce the slipperiness of the horizontal upper surface by attaching abrasive and welded strips.

Neither of these attempts were of considerable success and eventually the aluminum T-bar slats were abandoned and no such flooring is currently manufactured today and is likely that all such flooring previously installed has become corroded and replaced.

In a published article in the paper "Feld und Wald" No. 16 of 16th Apr. 1976 is disclosed the use of elongate aluminum panels which span the space across the pit and are therefore supported at respective ends on the sides of the pit. This disclosure is similar to the aluminum T bars and is around the same time as the use of the T-Bar system. This does not mention corrosion and does not seem to have lead to wide scale adoption of this technique.

In general, therefore, the use of aluminum for flooring has been abandoned in view of the above problems and it is believed that those skilled in the art would reject use of aluminum or similar materials in view of these problems.

A subsequent approach for providing suitable flooring involved the provision of supporting beams across the pit and the laying over the supporting beams of a material known as "Tenderfoot" which comprises an expanded metal coated in a plastics material. The expanded metal is steel and the plastics material reduces corrosion of the steel and provides a more suitable flooring for the piglets.

A yet further proposal shown for example in the brochure "Polygrate" of the present assignee comprises a wholly plastics system in which the beams are extruded from fiberglass reinforced resin and the flooring covering those beams is formed from injection molded plastics material.

Both the Tenderfoot flooring and the Polygrate flooring have achieved considerable success and are widely used.

One problem that has however arisen with these materials is that the flooring is less suitable for location under the sow since the floor is less able to resist the high level abrasion from the heavy feet of the sow.

Flooring of cast iron grate or panels has therefore been manufactured for use under the sow. An alternative type of metal flooring which can resist the abrasion is that of a welded parallel steel rod construction known as "Tribar".

However these floors are unsuitable for positioning under the piglets since the piglet should be kept warm and the cooling affect of the thermal conductivity of the metal and the chimney affect of the air from pit passing through the openings in the floor tends to cool the piglets at too high a rate. An attempt has been made to solve this problem by increasing the temperature of the farrowing crate and this of course causes stress to the sow who is used to a temperature much lower than that is required by the piglets.

The solution currently widely being used is therefore to provide a plastics flooring or a plastics coated flooring In the area under the piglets and to provide under the sow a flooring of a cast iron grate. The cast iron grate can be laid on supporting beams or in some cases is supported on metal webs located at the edge of the plastics flooring. One example of arrangement of this type is shown PCT International Application WO95/18525.

However cast iron has significant disadvantages. Cast iron is difficult to maintain hygienic because it is porous and hence retains moisture carrying bacteria in the pores and has a surface which has a tendency to retain moisture and to remain wet again allowing bacteria to remain and multiply on the surface. Yet further, the cast iron tends to corrode by developing rust on the surface. While this corrosion is generally insufficient to cause structural break down, it does provide further pores and spaces for harbouring moisture and therefore dangerous bacteria. Despite these disadvantages, the cast iron grate or slat under the sow represents the current standard in the art.

Another arrangement is disclosed in DE G9320652 assigned to Ikadan Systems of Denmark published in 1995 which corresponds to U.S. Pat. No. 5,687,534 issued 18th Nov. 1997. This discloses a steel beam system with the beams extending across the manure pit to support the flooring. The flooring includes cast iron gratings which are arranged to be supported by the beams. In order to support the cast iron gratings in a manner which is more suitable, the applicant provides a plurality of hanger members which are formed of plastics material. These hangers are provided for structural reasons and are not in any way concerned with electrical insulation.

Yet another arrangement uses PVC pipes for supporting the sow and attempts to cool the sow by communicating heat from water in the pipes to the drinking water. This arrangement was commercially unacceptable as the flooring could not accommodate the hard wearing effect of the feet of the animal. This arrangement is shown in a brochure by INSERT.

SUMMARY OF THE INVENTION

It is one object of the present invention, therefore, to provide an improved flooring which overcomes the disadvantages of the prior art.

According to a first aspect of the invention, therefore, there is provided a flooring apparatus for a farrowing containment area for animals, the containment area having two side edges, a front edge and a rear edge and being located over a manure containment pit, the apparatus comprising:

a plurality of support members for extending over the manure containment pit;

a first floor portion which is formed from a material selected from the group consisting of aluminum, magnesium, zinc and alloys thereof;

a second floor portion which is formed of a plastics material which is electrically non-conductive;

at least part of the first floor portion having an upper surface which is apertured to allow escape of manure from the animals into the pit;

the first floor portion forming a first sub-area of the containment area having a front edge, a rear edge and two side edges;

at least two remaining sub-areas of the containment area being formed by said second floor portion such that the two remaining sub areas each lie along a respective side edge of said first sub-area such that the two side edges of the first sub-area are spaced from adjacent side edges of the containment area;

the support members being formed of an electrically non-conductive material so as to provide electrical isolation of the first floor portion to prevent galvanic corrosion thereof.

Preferably the second floor portion includes at least one additional sub area each arranged along at least one of the front and rear edges of the first sub area.

Preferably the second floor portion is molded from a plastics material.

Preferably the first and second floor portions are formed from panels which are rectangular and of the same width.

Preferably the panels of the first floor portion have upper surfaces thereof at a raised height relative to the panels of the second floor portion.

Preferably the first panels each have an edge flange inclined downwardly onto the upper surface of the second panels, the flange having downwardly extending tabs for engaging into openings in the second panels to interlock at edges thereof to form an integral floor.

Preferably the support members include a plurality of beams and a plurality of cross webs arranged in parallel, spaced relation substantially at right angles to the beams with the first and second panels being supported on the cross webs.

Preferably the first panels each include at each end a cooperating pair of interlocking web engagement members extending outwardly to a respective side of the panel for engaging a top of a respective one of the cross webs for communicating weight from the first panels to the cross webs.

According to a second aspect of the invention there is provided a flooring apparatus for a farrowing containment area for animals, the containment area having two side edges, a front edge and a rear edge and being located over a manure containment pit, the apparatus comprising:

a plurality of support members for extending over the manure containment pit;

a first floor portion which is formed from a material selected from the group consisting of aluminum, magnesium, zinc and alloys thereof;

a second floor portion which is formed of a plastics material which is electrically non-conductive;

at least part of the first floor portion having an upper surface which is apertured to allow escape of manure from the animals into the pit;

the first floor portion forming a first sub-area of the containment area having a front edge, a rear edge and two side edges;

said second floor portion forming sub areas each of which lies along a respective one of the front, rear and side edges of said first sub-area such that the front, rear and side edges of the first sub-area are spaced from adjacent side edges of the containment area so as to form an island which is spaced from each of the front, rear and side edges of the containment area by the second floor portion and which is electrically isolated from the front, rear and side edges of the containment area by the second floor portion;

and the first floor portion being supported relative to the second floor portion and the support members such that the first floor portion is electrically isolated from any other electrically conductive element forming part of or associated with the flooring apparatus to prevent galvanic corrosion thereof.

According to a third aspect of the invention there is provided a flooring apparatus for a farrowing containment area for animals, the containment area having two side edges, a front edge and a rear edge and being located over a manure containment pit, the apparatus comprising:

a plurality of support members for extending over the manure containment pit;

a first floor portion which is formed from a material selected from the group consisting of aluminum, magnesium, zinc and alloys thereof;

at least part of the first floor portion having an upper surface which is apertured to allow escape of manure from the animals into the pit;

the first floor portion forming a first sub-area of the containment area having a front edge, a rear edge and two side edges;

the first floor portion comprising at least one rigid panel defined by a plurality of cross beams at spaced positions along a length of the panel and a plurality of extruded members extending longitudinally of the panel at right angles to the cross beams and attached thereto, the extruded members being parallel and spaced each from the next to leave openings therebetween, the cross beams and the extruded members being formed from said material;

a second floor portion which is formed of a plastics material which is electrically non-conductive;

at least two remaining sub-areas of the containment area being formed by said second floor portion such that the two remaining sub areas each lie along a respective side edge of said first sub-area such that the two side edges of the first sub-area are spaced from adjacent side edges of the containment area;

the support members being formed of an electrically non-conductive material so as to provide electrical isolation of the first floor portion to prevent galvanic corrosion thereof.

Preferably said at least one panel comprises a single panel defining the whole of the first floor portion.

Preferably said extruded members are welded to the cross beams.

Preferably the extruded members are generally triangular in cross-section with a generally horizontal upper surface and two sides converging downwardly and inwardly to a bottom apex underneath the top surface.

Preferably the extruded members are arranged alternately such that alternate ones thereof have an upper surface thereof at a raised height and a lowered height.

Preferably the cross beams each comprise a flat web standing in a vertical plane with a series of recesses in an upper edge thereof at spaced positions thereacross such that each extruded member is received in a respective one of the recesses.

Preferably the recesses are arranged such that an upper surface of each extruded member is no higher than the upper edge of the web.

Preferably there is provided a welded bead across the upper edge of the web and over the upper surface of each extruded member in turn.

Preferably the extruded members are hollow so define a tubular duct along the length thereof.

Preferably there is provided a source of cooling fluid for passing along the tubular ducts of the extruded members for cooling the first floor portion.

Preferably the apparatus includes a heat pump for extracting heat from the cooling fluid for cooling the fluid and a heat transfer member for receiving the heat from the heat pump for transferring the heat to the second floor portion.

Preferably the apparatus Includes a flat plate covering a part of the first floor portion and attached thereto.

According to a fourth aspect of the invention there is provided a flooring apparatus for a farrowing containment area for animals, the containment area having two side edges, a front edge and a rear edge and being located over a manure containment pit, the apparatus comprising:

a plurality of support members for extending over the manure containment pit;

a first floor portion forming a first sub-area of the containment area;

the first floor portion comprising at least one rigid panel defined by a plurality of cross beams at spaced positions along a length of the panel and a plurality of elongate tubular members extending longitudinally of the panel at right angles to the cross beams and attached thereto, the elongate tubular members being parallel and spaced each from the next to leave openings therebetween;

a second floor portion defining at least two remaining sub-areas of the containment area such that the two remaining sub areas each lie along a respective side edge of said first sub-area such that the two side edges of the first sub-area are spaced from adjacent side edges of the containment area;

the elongate tubular members being hollow so as to define a tubular duct along the length thereof.

a source of cooling fluid for passing along the tubular ducts of the extruded members for cooling the first floor portion.

a heat pump for extracting heat from the cooling fluid for cooling the fluid;

and a heat transfer member for receiving the heat from the heat pump for transferring the heat to the second floor portion.

BRIEF DESCRIPTION OF THE DRAWINGS

One embodiment of the invention will now be described in conjunction with the accompanying drawings in which:

FIG. 7 is an enlarged view of one corner of the panel of FIG. 6.

FIG. 8 is a cross-sectional view along the lines 8—8 of FIG. 6.

FIG. 10 is a cross-sectional view along the lines 10—10 of FIG. 9.

FIG. 11 is a cross-sectional view along the lines 11—11 of FIG. 10 showing the welded flooring section only on an enlarged scale and showing a cooling arrangement for the sow.

In the drawings like characters of reference indicate corresponding parts in the different figures.

DETAILED DESCRIPTION

Figure 1:
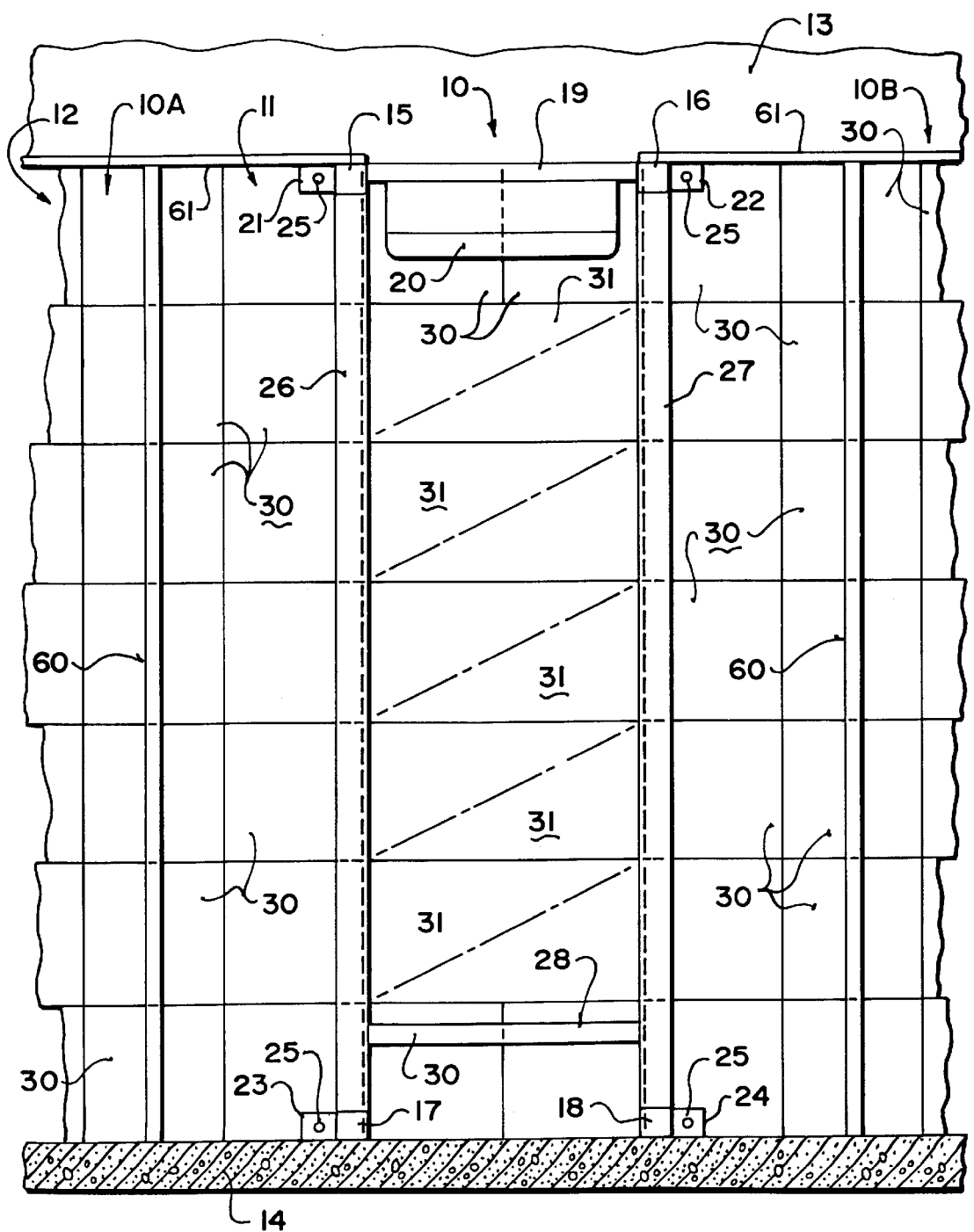
FIG. 1 is a top plan view of a farrowing crate showing the flooring according to the present invention including first aluminum panels and second plastics panels.
Figure 2:
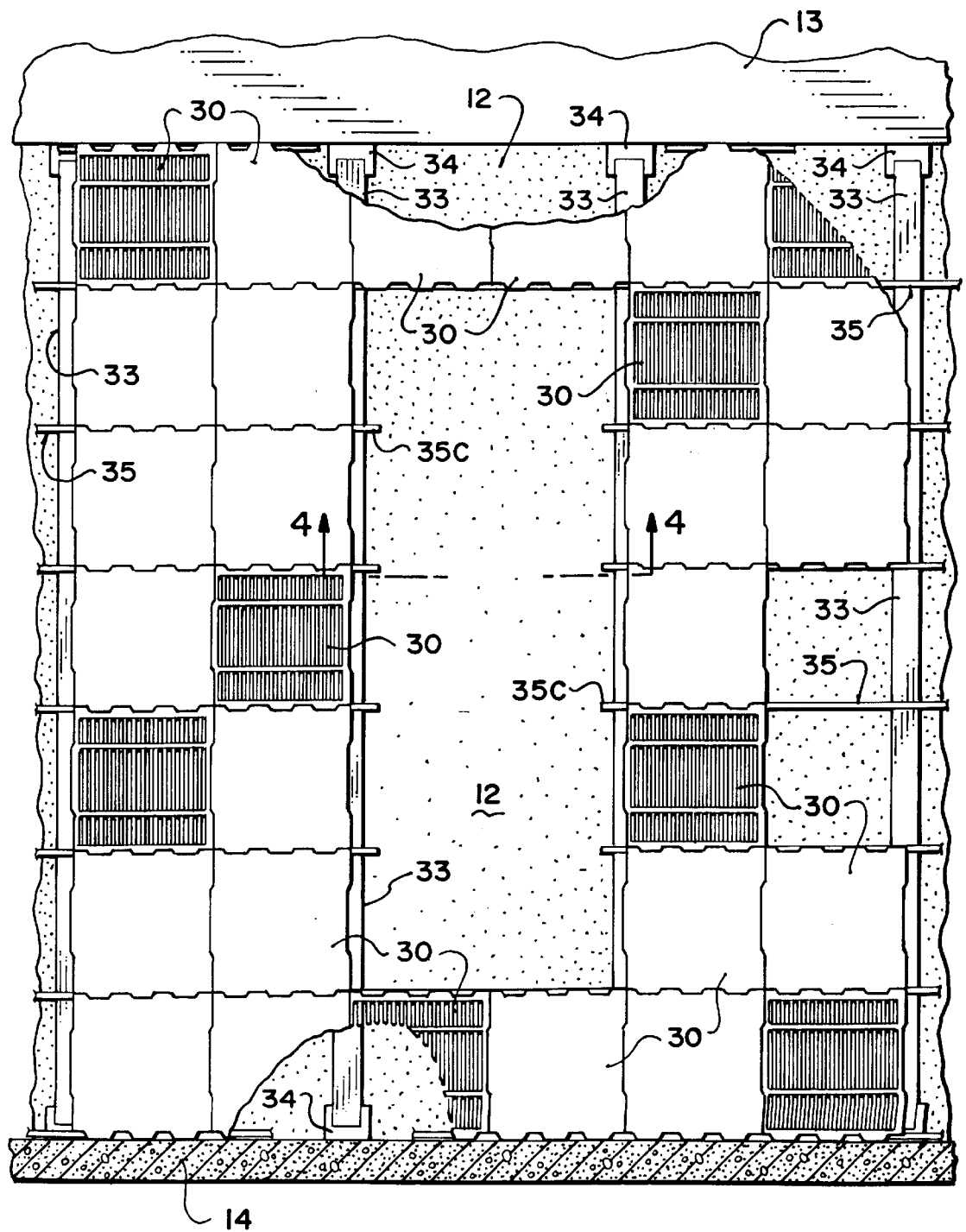
FIG. 2 is a top plan view showing the flooring in more detail with the farrowing crate and the aluminum panels removed.

A farrowing pen Is shown in top plan view in FIG. 1 and the flooring for the farrowing pen is shown in more detail in FIG. 2. The farrowing pen is generally indicated at 10 and lies along side and next to adjacent farrowing pens 10A and 10B. The farrowing pen includes a flooring generally indicated at 11 which overlies a pit 12 arranged between the alleyway 13 on one side and a rear wall 14 on an opposed side.

The farrowing pen includes a farrowing crate comprises a metal structure which confines the sow within the farrowing crate. The metal structure is shown only schematically since various different designs are available and since the structure is well known to one skilled in the art. The farrowing crate thus comprises four metal vertical posts 15, 16, 17 and 18 which are arranged at a front and rear respectively of the farrowing crate. Between the posts 15 and 16 is provided a front gate 19 which can be opened to allow the sow to enter the alley way when it is required for the sow to be removed from the farrowing crate. On the front gate 19 is mounted a feeder 20 which can be accessed by the sow while in the farrowing crate for taking feed and water as required. The posts are bolted to the floor 11 by horizontal flanges 21, 22, 23 and 24 respectively which extend outwardly to one side of the post. Each flange includes a hole by which it can be bolted using a bolt 25 to the flooring 11. The farrowing crate further includes horizontal rails 26 and 27 extending between respective pairs of the posts 15, 17, and 16, 18 each along respective side of the area confined for the sow. The rails include plurality of horizontal rails and may include anti-crush bars and other guide bars which assist in locating the sow, particularly when the sow lies down to avoid crushing piglets which may be lying on either side of the sow. The farrowing crate further includes a horizontal backup bar 28 which extends between the two sides of the farrowing crate to prevent the sow from backing up to the rear wall 14, particularly to prevent the sow from being too close to the rear wall during the birthing procedure.

The farrowing crate is closed on its sides and front by upstanding vertical walls 60, 61 which are sufficient merely to confine the piglets. The walls 61 are arranged half way across a panel 30 so that the portions of the farrowing crate between the central island the side walls 60 is formed by one and a half panels in width. Of course the second half of the divided panel becomes apart of the next adjacent farrowing crate 10A.

Different layouts of the panels can be provided including more plastics panels in the creep area for the piglets providing an increased area. In one arrangement, two panels are arranged on one side of the sow area and four panels on the opposite side. In addition, the sow area can be arranged at an angle to the front and rear edges of the pen.

The flooring system 11 comprises a plurality of flooring panels 30, 31. The flooring panels are rectangular and arranged in an array side by side so as to extend from the rear wall 14 to the alley way 13.

The flooring further includes a support structure for the panels including a plurality of horizontal beams 33 which are carried in suitable brackets schematically indicated at 34. The beams extend across the pit and are mounted at one end on the alley 13 and at the opposed end at the rear wall 14. The brackets 34 can be of various different types depending upon the type of surface available and whether the weight should be transferred to a vertical surface or to the base of the pit. The brackets are shown therefore only schematically. The number of and arrangement of the beams is arranged to be suitable to transfer the loading from the floor to the support surfaces and preferably therefore the beams are spaced on either side of the sow so as to be provided under the sow area with the necessity only for at most a single beam supporting the area under the piglets.

Figure 3:
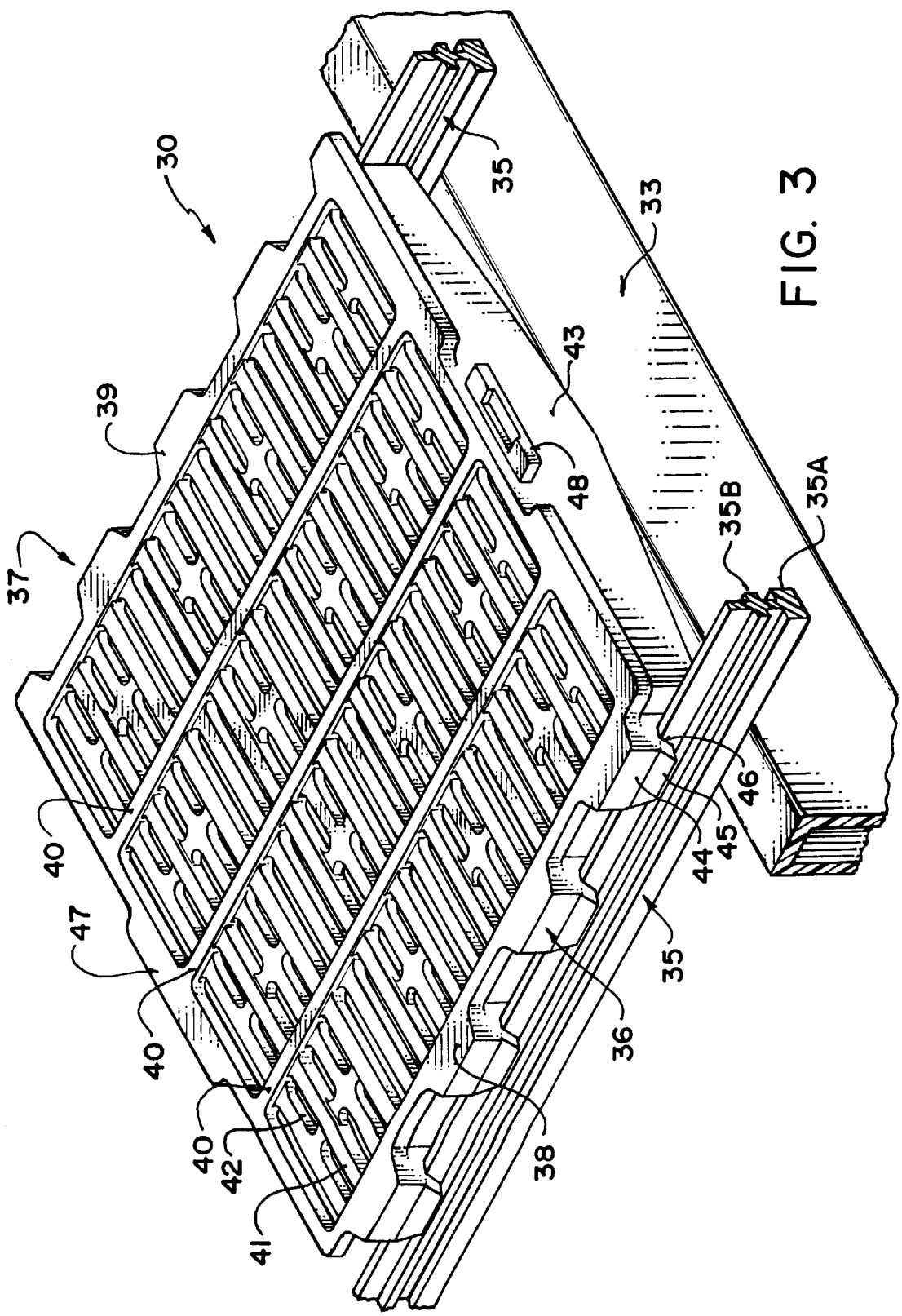
FIG. 3 is an isometric view showing one plastic panel of the flooring mounted on the supporting floor structure.

Across the beams is laid a plurality of supporting webs 35 at longitudinally spaced position along the length of the beams. The webs 35 define a vertical flange standing upwardly from the beam and are spaced by the length of a panel so that front and rear edges 36, 37 of a panel are arranged to lie on top of a top edge of the respective webs 35. Thus the load from the panel is transferred to the vertical webs which in turn is transferred to the beams 33 for supporting the flooring structure defined by the panels above the pit. The webs 35 include a base 35A for sitting on the beam and a stiffening cross-piece 35B. As shown in FIGS. 2 and 3, the webs 35 which would pass through the area under the sow terminate at positions just inside the adjacent beam to form protruding ends 35C.

The panels 30 are shown in more detail in FIG. 3. The panels are generally of a shape and arrangement shown in the above brochure of "Polygrate" manufactured by the present assignee. Thus the panels are formed from a molded plastics material to define transverse ribs 38 and 39 at the front and rear edge respectively of the panel together with the plurality of intervening ribs 40 at spaced positions along the length of the panel. In between the ribs are provided a plurality of longitudinal ribs 41 defining in between them openings 42 through which materials including manure can fall into the pit. The transverse ribs 38, 39 and 40 provide restrictions to sliding movement in a longitudinal direction of the panel and the ribs 42 provide restrictions to transverse sliding movement along the panel. Thus the feet of the animals are prevented from slipping longitudinally and transversely while the openings allow the passage of manure to the pit.

Underneath the various ribs are provided webs one of which is shown 43 providing structural strength sufficient to support the weight of the animal and to transfer the weight to the flanges 35.

At the front and rear edges 36 and 37, the panels each include castelated sections which allow the panels to interleave with the projection at one edge extending into a recess between two projections at the next adjacent edge of the next adjacent panel. The projections 44 each include a downwardly extending lip 45 defining a recess 46 behind the lip into which the top edge of the flange 35 extends. Thus the top edge of the flange is trapped in the recess 46 and it will be appreciated that the projections of the next adjacent panel includes similar lips 45 which extend down behind the flange 35 so the flange is trapped in the area between the overlapping castilated sections of the panels.

At the sides of the panels there are also provided a projection 47 on one side which interconnects with a recess and receptacle 48 on the opposed side of the panel. Thus the panels interlock to form the overlying interlocking structure best shown in FIG. 2.

The panels 30 are formed from injection molded plastics material

The panels 31 are formed by pressure molded from aluminum, magnesium, zinc, or alloys of those materials. Pressure molding is a known technique which is similar to that used for injection molding and is intended for metals rather than plastic materials. Pressure molding thus uses a permanent machined mold generally formed from steel. The pressure molding is generally effected at an elevated pressure, as opposed to simple casting, so that it insures to form a smooth continuous product with no pores or open spaces.

The use of aluminum, magnesium, zinc or alloys of those materials insures that the finished product has a finished surface which is relatively smooth and is free from pores which can collect moisture and harbour bacteria. Aluminum, magnesium, and zinc also have a very high coefficient of thermal conductivity which is significantly higher than that of cast iron for effective cooling of the sow. Pressure molding of the aluminum also provides a stronger product which thus allows manufacture of a panel with a higher proportion of voids between the structural members to allow increased passage of manure and therefore increased sanitation.

The beams 33 and the webs 35 are formed from a electrically non-conductive material such as glass fiber reinforced resin. The beams and the webs or flanges can therefore be formed by the known technique of pultrusion thus forming a tubular rectangular beam and simple flange or web, both of which have sufficient strength to accommodate necessary forces.

As shown In FIGS. 1 and 2, the panels 31 are arranged end to end and side by side to form an array which is indicated by diagonal lines. The array as shown is defined by five panels long with each panel having a width equal to that of the panels 30 and a length preferably double the width so as to span the length of the opening forming an area which will be of the order of five feet by two feet. This area is arranged between the rails 26 and 27 of the crate, that is, in the area under the sow. The area of the panel 31 is however spaced from the front and rear edges respectively of the flooring system. Thus between the rear edge of the area is located two panels 30 thus spacing the edges of the panel 31 from the rear wall 14. Similarly two panels 30 are arranged in front of the area of the panels 31 thus again spacing the front edge of the panels from the alley 13 and from the steel legs of the farrowing crate.

The side rails 26 and 27 are spaced from the flooring so that there Is no connection between the steel side rail 26 and 27 and the flooring. The only connection of the steel structure of the crate with the flooring is thus provided by the flanges 21–24 which are bolted to the panels 30.

As the panels 30 are formed from injection molded plastics material, they are formed of electrically non-conductive material so there is no possibility of electrical connection between the crate and the area of the flooring defined by the panels, 31.

Thus the area of the panels 31 form an island within the surrounding area defined by the panels 30.

The only objects therefore in contact with the panels 31 are the edges of the panels 30 which are electrically non-conductive, the webs 35 and beams 33 all of which are again electrically nonconductive. Thus there Is no possibility of an electrical connection between the panels 31 and the other electrically conductive material such as the steel of the crate, the concrete and steel of the alley and walls, water supply pipes, or the feeder or any other object.

The sow therefore is arranged to lie or stand on the area defined by the panels 31. The feet of the animal generally do not reach to the front and rear panels in view of the back up bar and the feeder thus locating the animal directly on the Island formed by the panels 31.

The use of the aluminum, magnesium or zinc when pressure molded has the following advantages;

i) It is non-porous in comparison with cast iron and thus it dries readily thus reducing the possibility of fostering bacterial growth by harbouring the bacteria on the surface.

ii) It provides resistance to wear so that the feet of the animal do not affect damage or gradual break down of the flooring due to the abrasion from the feet of the animal.

iii) It provides a very high coefficient of thermal conductivity so that it cools rapidly. The material therefore tends to remain cooler than the surrounding plastics material. This cooling effect is more comfortable for the sow who prefers generally a cooler environment than the piglets. Also the high thermal conductivity facilitates the rapid cooling of the floor under the sow when the sow rises. If the floor remains warm under the sow too long after the sow stands as in the case with steel or cast iron, this could cause the piglets to lie on the area warmed by the sow with the danger of crushing when the sow lies. The piglets are thus deterred by the cool flooring and the cooling effect of the flooring from lying in the area and instead choose to lie in the area of the plastics flooring where they are warmer and safe from crushing.

iv) It does not rust but instead forms an oxide coating which covers and protects the surface thus preventing the collection of materials in the pores of the rust layer.

Turning now to FIGS. 4 to 8, the details of the panels 31 are shown which are the first panels formed from aluminum.

Figure 5:
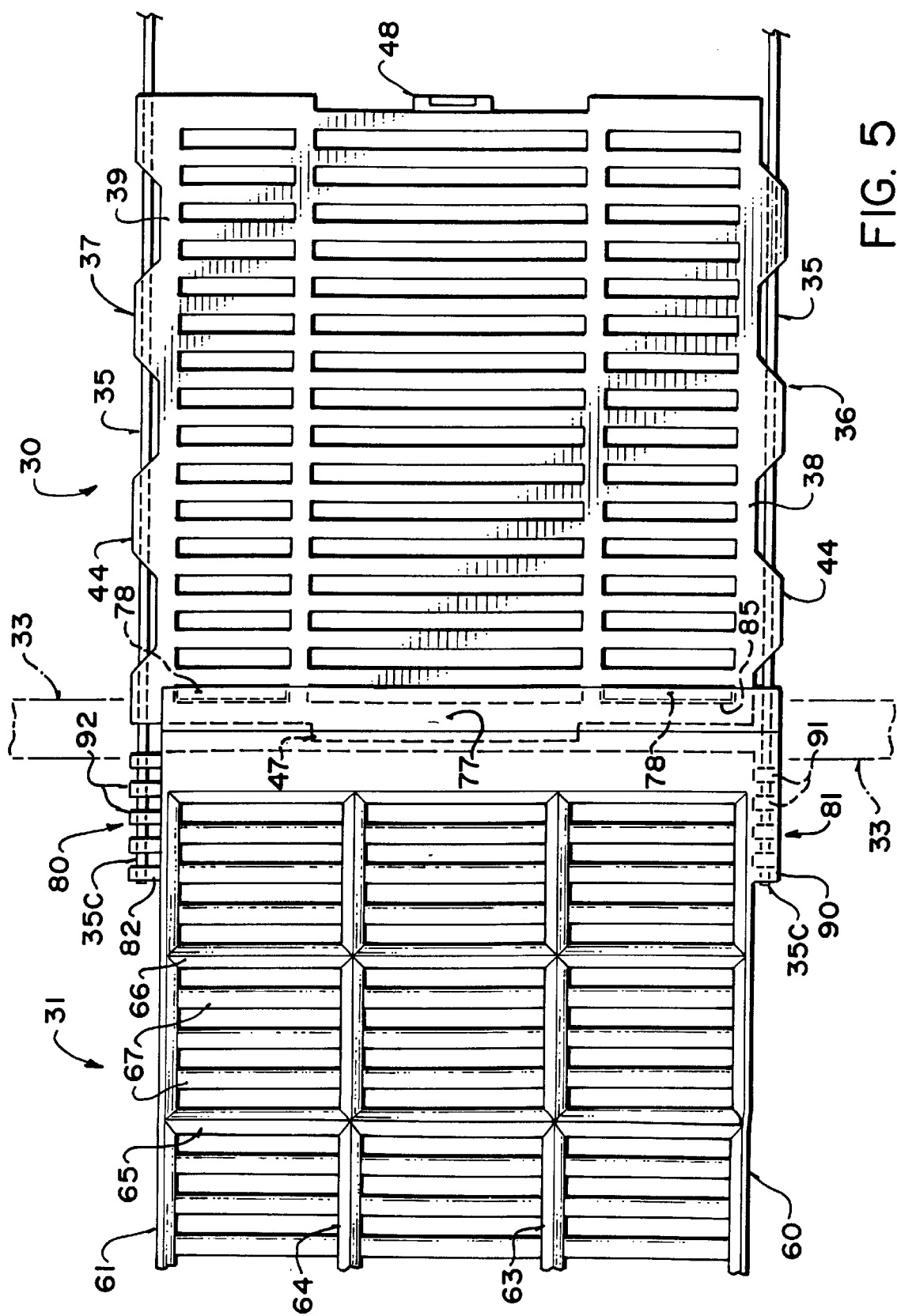
FIG. 5 is a top plan view of one portion of the flooring structure of FIG. 1 showing part of one aluminum panel and one plastic panel.
Figure 6:
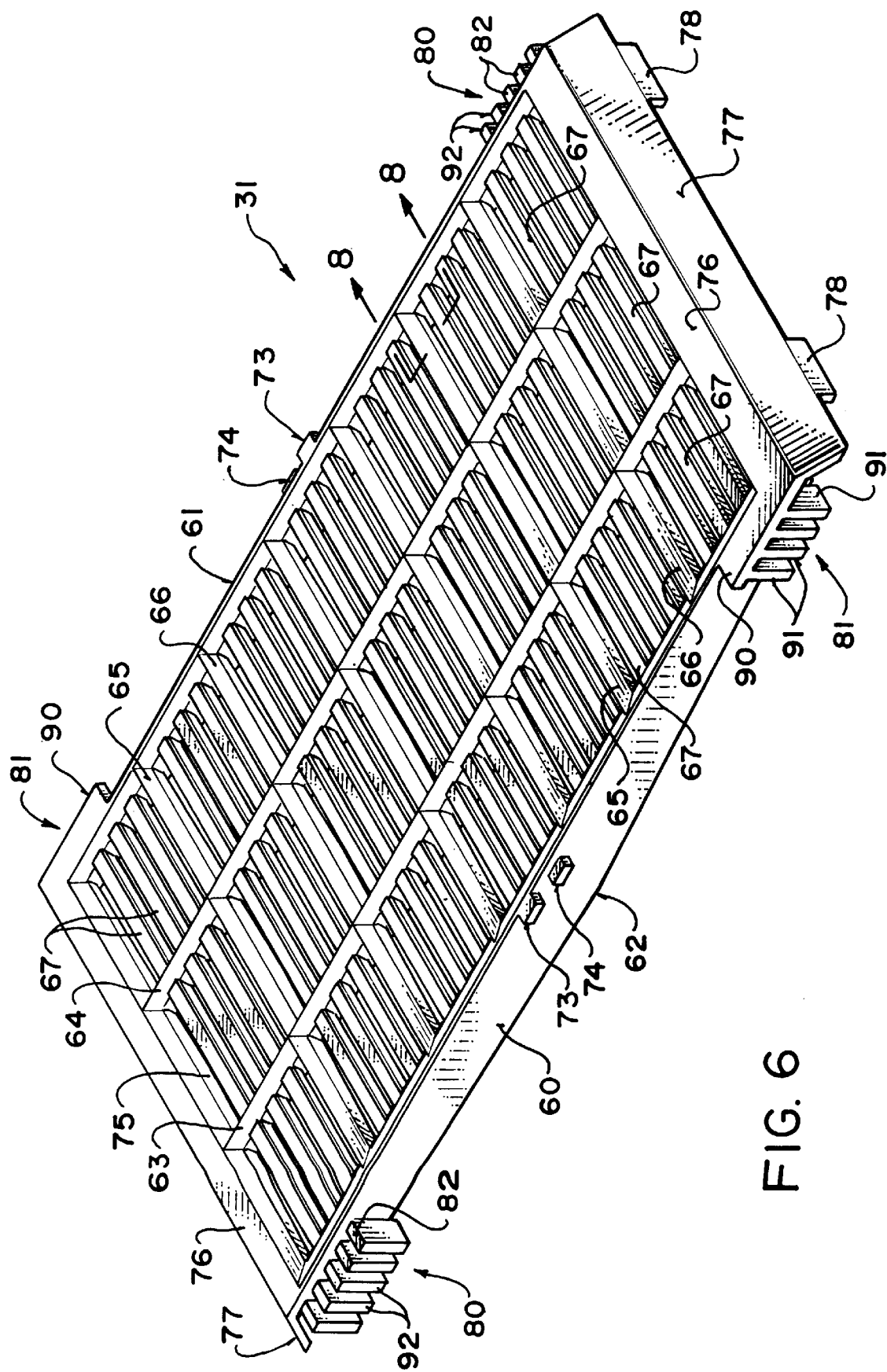
FIG. 6 is an isometric view of one aluminum panel.
Figure 9:
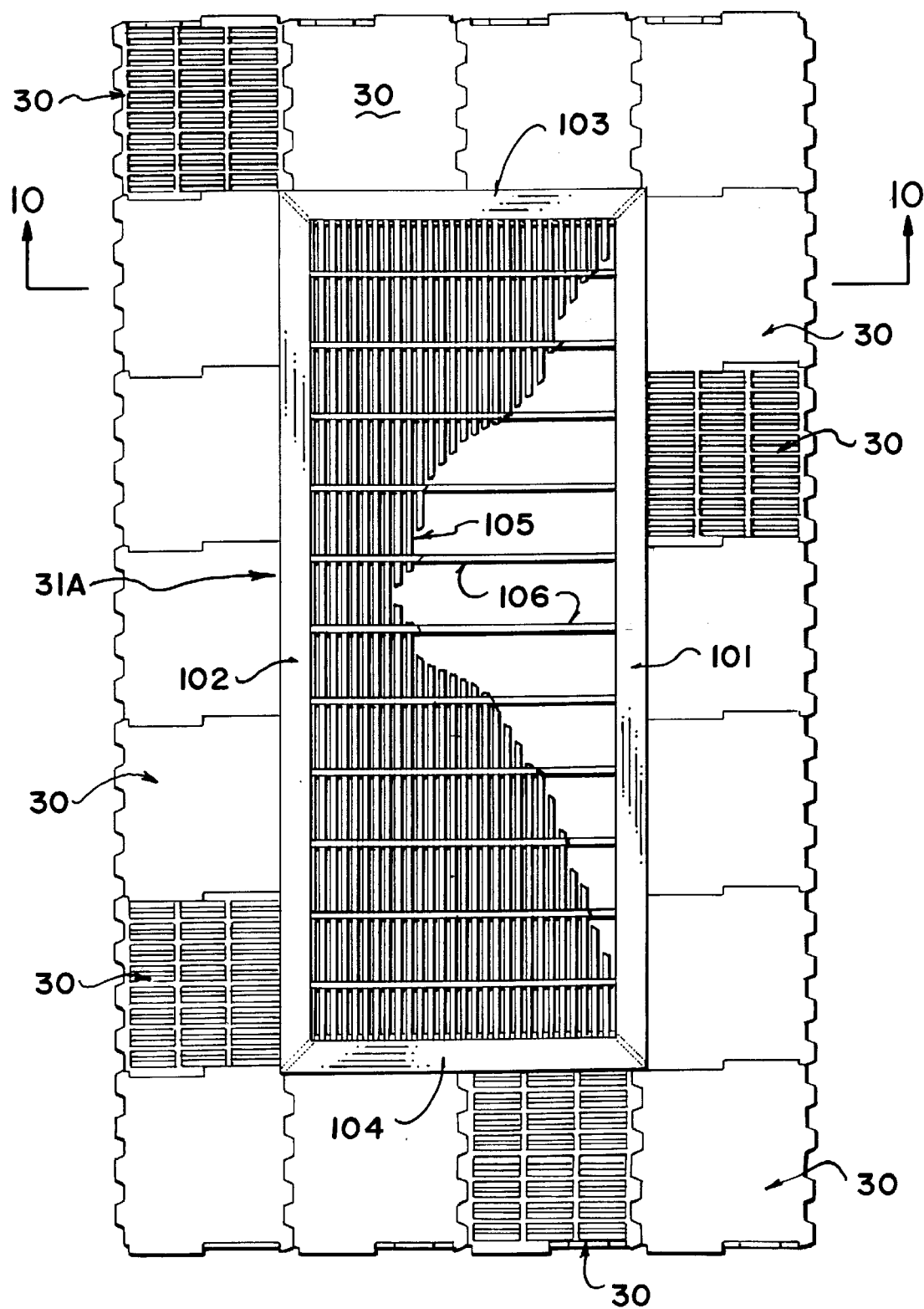
FIG. 9 is a top plan view of a modified arrangement using a single welded aluminum flooring section for the central island portion.

The panels are elongate so that the length of the panel is approximately double the width of the panel so that each panel spans the full width of the opening under the sow and has a width equal to the width of the second panels 30 as best shown in FIG. 5.

Each panel is integrally molded to form two sides 60 and 61 each of which forms a vertical flange so as to provide structural strength with the flange increasing in width toward a central apex 62. Between the sides are two longitudinal, transversely spaced ribs 63 and 64 which have upper surfaces substantially at the same height as the sides. Across the panel is defined a plurality of transverse, longitudinally spaced ribs 65, 66 which are spaced by approximately the same spacing as the ribs 63 and 64 so as to provide rectangular areas in the ribs. Across these rectangular areas is defined a plurality of further ribs 67.

The cross section of the raised ribs 63, 64, 65, 66 is as shown in FIG. 8 where the cross section is the same as that indicated at 65. Thus the ribs of that cross sectional shape converge downwardly and inwardly at a lower section to form a V shaped portion 68 which diverges outwardly to sides 69 and 70. Between the sides the top surface is arched as indicated at 71. The ribs 67 in the rectangular areas between the raised ribs are of a lower height and have a top surface 72 which is flat between the sides 69 and 70. Thus the panel forms pockets in between the raised ribs defined by the top surfaces 72 of the lower ribs so that the pocket can receive the foot of the sow to assist in providing traction.

Each of the sides 60 and 61 includes a pair of transversely extending flanges 73 and 74 so that the flanges of one panel can interconnect with the flanges of the next adjacent panel. Thus the flange 73 is raised that is at the same height as the top of the side wall whereas the flange 74 is at a lower height for underlying the flange of the next adjacent panel. In this way the flanges 73 and 74 cooperate to prevent lifting of one panel relative to the next and to communicate downward forces from one panel to the next.

Figure 4:
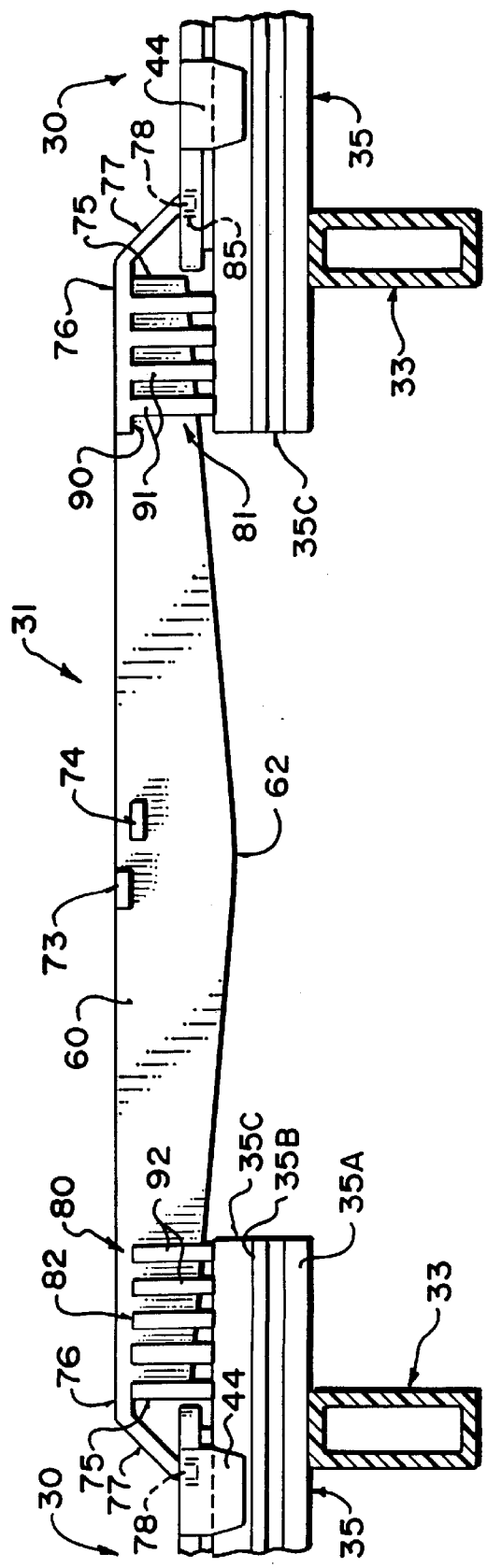
FIG. 4 is a vertical cross sectional view through the flooring according to the present invention.

Each end of each panel is defined by an end wall 75 which forms an end rib similar to the ribs along the side. Each end also includes a flange section including a horizontal extension portion 76 and a downwardly and outwardly inclined flange 77. The flange 77, as described hereinafter provides a surface which communicates from the top surface of the panels 31 to the top surface of the panel 30 as best shown In FIG. 4. At the bottom edge of each flange 77 is provided a pair of downwardly extending lugs 78 which are spaced outwardly toward the sides of the panel leading a centre section of the edge of the flange bare from the lugs.

Adjacent each end of the panel, the side walls each include a pair of web engaging members 80 and 81 each extending outwardly to the respective side. Each of the members 80 and 81 is arranged for sitting on a respective web 35 and communicating forces from the panel onto the web. The member 81 includes a top flange 90 having a horizontal section lying along the side wall and an inclined section which generally follows the shape of the flange 77. The member 81 defines a raised top surface which lies In the top surface of the panel and include the flange portion 90 thereof which is coplanar with the flange 77. In addition each member 81 includes a series of parallel, vertical spaced support webs 91 each at a right angle to the side of the panel.

The member 80 includes a top surface 82 which is spaced downwardly from the top surface of the panel by a distance equal to the thickness of the flange portion 90 of the member 81. The member 80 is defined by a series of parallel, vertical spaced support webs 92 each at a right angle to the side of the panel. In this way it will of course be appreciated that the flange 90 of the next adjacent panel can lie over the top surface 82 of the member 80 so that the flange 90 communicates vertical forces from one panel to the next. The support webs 91 are arranged to be interleaved with the webs 92 such that both can sit on the web 35 and communicate forces thereto. Both sets are covered by the single flange 90 of the member 81 so as to prevent collection of manure. The side edge of the flange 90 abuts the side edge of the next adjacent panel thus spacing the side wall of the next adjacent panel from the panel.

In the assembled condition shown in FIGS. 4 and 5, it will be noted that the webs 91 and 92 rest upon the top surface of the projecting portion 35C of the webs 35 so as to communicate forces from the panel into the top surface of the web and thus through to the beams 33. As the panels 31 are equal in width to the panels 30, the webs 35 are located by the panels 30 by the engagement with the castellated portions and the webs are held vertical by that engagement.

The edge of the flange 77 is arranged to rest upon the top surface of the panel 30 but is dimensioned so that little or no force is communicated vertically from the panel 31 to the panels 30 via that flange.

The lugs 78 are arranged so as to engage into a respective one of the openings in the panel 30 as indicated at 85. The lugs thus locate the panel 31 on top of the panel 30 and prevent longitudinal movement of the panel 31 relative to the panel 30 at either end of the panel 31. The lugs 78 can be shaped particularly at ends of the lugs so as to bite into the ends of the openings 85 in the panel 30 to provide a locking effect resisting retraction of the lugs from the panel 30.

Thus both the panels 30 and the panels 31 have ribs for assisting in traction and openings for allowing manure to fall through. The flanges 77 at the ends of the panels 31 prevent inhibit the passage of material into the area underneath the edge of the panel and are located vertically above the beams 33 to provide a capping effect.

In an alternative arrangement (not shown) commonly used in Europe, the flooring is turned at an angle to the front and rear walls so that the island formed by the panels 31 is arranged substantially diagonal to the area of the farrowing crate. The island is itself rectangular and is spaced from the front and rear edges of the farrowing crate by the plastics panels substantially as previously described.

The flooring can be formed to avoid the use of the pockets in the upper surface but instead can use the high rib/low rib arrangement known in the prior art.

Instead of providing both the beams and the webs formed from nonconductive material, one or other may be formed of metal such as steel provided that the support arrangement for the aluminum flooring panels prevents any electrical conduction to the metal.

Turning now to FIGS. 9 through 12, there is shown a modified arrangement which provides two further advantages.

Firstly the first flooring section forming the central island is formed as a single panel defined by a plurality of longitudinally extending extruded support members and a plurality of transverse support beams to which the extruded members are welded. Instead of forming the island therefore from cast material, the island can be formed more cheaply from a combination of extruded bars or support members and transverse beams to which the extruded bars are welded. Preferably the panel is formed in a single piece since this is the most efficient manner for manufacture. However the panel can also be formed in two or more pieces separated transversely. In situations where the underlying support beams provide a degree of flex which is greater than that of the welded panel, it may be desirable to divide the panel into two portions so that the two portions can flex to a degree matching that of the support beams.

The extruded bars can be solid as shown in FIG. 10. As an alternative, the extruded bars can be hollow defining a longitudinally extending tubular duct. As the extruded bars are manufactured by extrusion, the cross-sectional shape can be simply tailored to requirements and therefore hollow tube can readily be manufactured.

The hollow tube can provide a conduit for cooling liquid so as to assist in maintaining the sow cooled. The cooling fluid can be cooled by a heat pump which extracts heat from the cooling fluid and transfers that heat to a radiator system for adding heat to the piglets.

Turning therefore to the details showing in the Figures, the panels 31 are substantially as previously described and cooperate with the remainder of the farrowing crate in the manner previously described particularly in regard to FIG. 1. However the individual panels 31 of FIG. 1 are replaced by a single panel 31A which lies over the opening defined in the area where the panels 31 are omitted.

The single panel 31A includes two side support flanges 101 and 102 and two end support flanges 103 and 104. The panel further includes a plurality of longitudinally extending parallel extruded bars 105 which are interconnected by transverse support beams 106. The structure formed by these elements is welded to form a rigid structure which is laid over the opening and spans the opening. All of the elements of the welded panel are formed from one of the above mentioned selected materials and preferably aluminium.

Thus as shown in FIG. 10, the panels 30 sit on the floor support joists 107. These joists are the type different from the joists 33 of the previous embodiment in that the joists include an upstanding flange 108 which extends into the receptacle 109 at the edge of the panel 30. The flange 108 thus in effect matches the flange 35 of the previous embodiment.

The panels 30 thus define an upper surface 110 at the receptacle 109 so that the flanges 101 and 102 lie over the upper surface and are supported thereby.

The cross-beams 106 are formed so that each defines an upstanding vertical web with a bottom edge 111 and a top edge 112. The top edge is cut to form a series of notches 113 and 114. The notches 113 are deeper than the notches 114. The notches are generally triangular in shape converging inwardly and downwardly to a bottom apex 115.

The extruded bars 105 are shaped to define a generally flat top surface 116 and two sides 117 and 118 converging inwardly and downwardly to the bottom apex 115. The notches 113 are cut so as to match the shape of the bar so as to receive the respective bar substantially wholly within the respective notch so that the upper surface 116 is aligned with the upper surface 112. The notches 114 are shallower and therefore the upper surface 116 of the bars in those notches stands proud of the upper surface 112.

Across the top surface 112 of each beam 106 is applied a bead 120 of weld which thus attaches to the upper surface 122 and across the top surface 116 of each of the bars. The bead thus rigidly attaches the bars to the beams 106 to form a rigid structure.

The flanges 101 and 102 are welded to end portions 121 of the beams 106 and have a width sufficient to extend outward beyond the end 122 of the beam to engage over the edge of the panel 30.

In the embodiment as illustrated, the bars in the shallower notches stand proud of the surface 112. It is also possible that the shallower notches provide an arrangement in which the bars are flush with the surface 112 and the deeper notches recess the upper surface from the surface 112.

The flanges 103 and 104 are welded to the end beam 106 and also are mitred with welded connections to edges of the flanges 101 and 102 so the surrounding flange structure is rigid and rigidly attached to the remainder of the panel.

The use of extrusion for manufacturing the bars allows the bars to be manufactured relatively cheaply using inexpensive tooling. The cutting of the transverse beams can be also be effected relatively simply and the welding is effected in a lay-up jig arrangement so the complete panel can be manufactured relatively simply and inexpensively. This avoids the use of expensive tooling necessary for casting individual panels since that tooling has a relatively limited life. Avoiding expensive tooling also allows modifications to be adopted relatively quickly.

Figure 12:
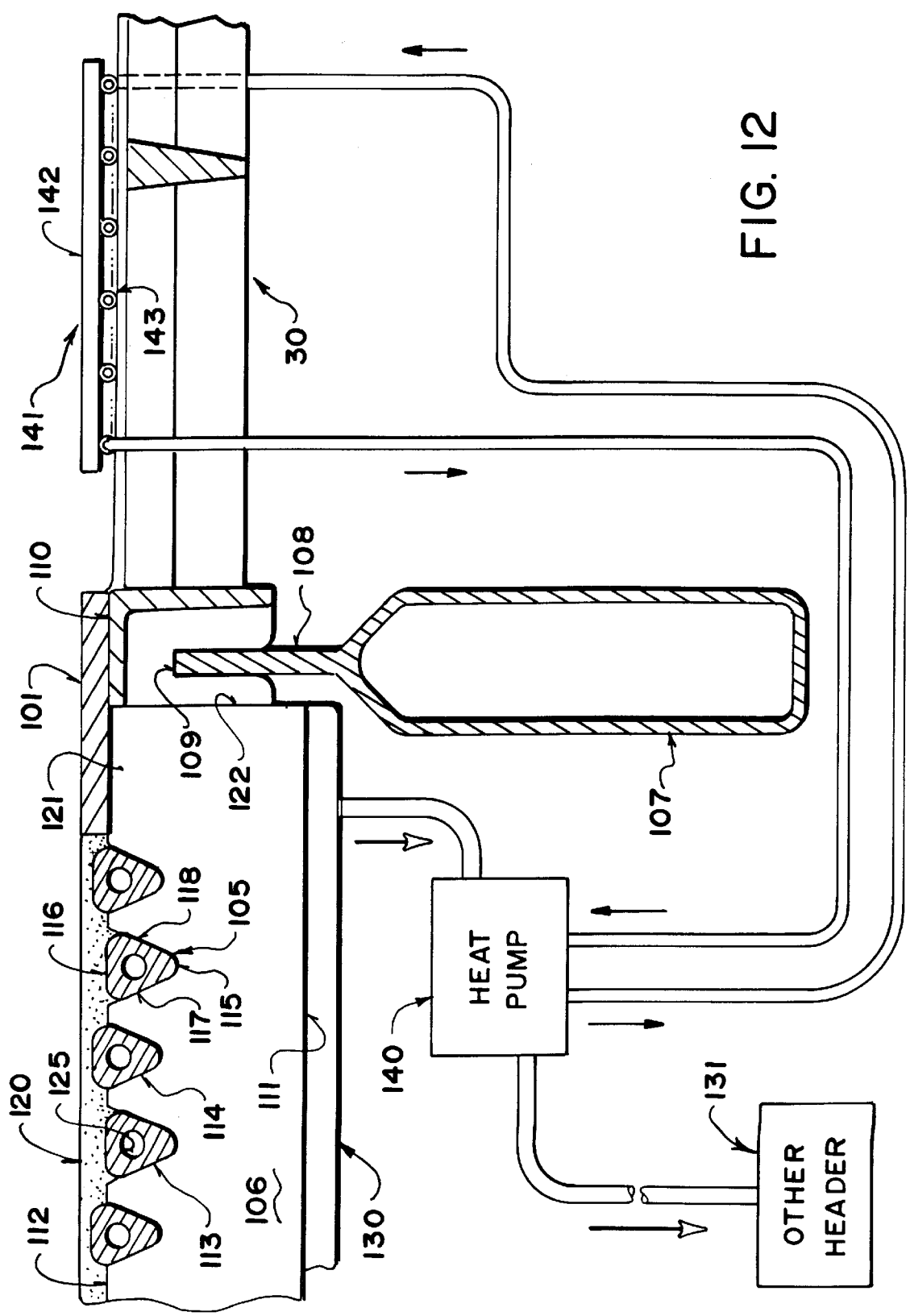
FIG. 12 is a cross-sectional view which is a portion only of FIG. 10 again showing the cooling arrangement.

In FIGS. 11 and 12, the bars are modified from the solid bars of FIG. 10 to define a hollow interior 125 forming a tubular duct along the length of each bar. In this embodiment, two transverse beams 126 and 127 are arranged adjacent the ends of the bars 105 and underlying the respective flanges 103 and 104. A base plate 128 closes a hollow interior 129 defined by the beams 126 and 127 so as to form a header communicating with the hollow interior of each of the bars 105. A first header 130 is provided at the flange 103 and a second header 131 is provided at the flange 104.

In this embodiment an additional plate 132 is attached over the top of the bars adjacent the end flange 104 which is the front of the farrowing pen to protect the feet of the animal.

The headers 130 and 131 are connected to a source of cooling fluid defined by a heat pump 140 so that fluid from the heat pump passes through the header 131, along the tubular ducts 125, from the header 128 and back to the heat pump 140. This cooling fluid thus acts to cool the bars to maintain the bars at a cooler temperature than the surrounding area to provide more comfort to the sow.

The use aluminium extruded bars allows the bars to be readily manufactured in the tubular hollow manner while maintaining sufficient strength to provide support for the sow.

The cooling of the central panel under the sow reduces the tendency of the piglets to lie in this area since they are made uncomfortable by the temperature so they are encouraged to move away from this area thus reducing possibility of crushing as the sow lies down.

The heat extracted from the cooling fluid can be communicated to a radiator 141 placed on the panels 30. The radiator comprises a flat radiating plate 142 on the underside of which is provided a radiator coil 143 which is supplied heated liquid from the heat pump 140. The coil 143 is provided on top of the panels and underneath a support plate in order to reduce the tendency of the heated air to rise which could otherwise form a chimney effect through the panels 30 drawing The use of aluminium as a material for the central panel therefore has the advantages previously described and utilises the electrical isolation system previously described. Yet further the panel can be manufactured relatively simply from extruded bars which allows a cooling effect to be utilised by passing the cooling fluid through the bars.

The flanges 101, 102, 103 and 104 are flat in the embodiment shown. However the flanges can be inclined outwardly and downwardly to lift the top surface of the central panel to a raised height above the top surface of the plastic panels if required.

Since various modifications can be made in my invention as herein above described, and many apparently widely different embodiments of same made within the spirit and scope, it is intended that all matter contained in the accompanying specification shall be interpreted as illustrative only and not in a limiting sense.

I claim:

1. A flooring apparatus for a farrowing containment area for animals, the containment area having two side edges, a front edge and a rear edge and being located over a manure containment pit, the apparatus comprising:
    a plurality of support members for extending over the manure containment pit;
    a first floor portion which is formed from a material selected from the group consisting of aluminum, magnesium, zinc and alloys thereof;
    a second floor portion which is formed of a plastics material which is electrically non-conductive;
    at least part of the first floor portion having an upper surface which is apertured to allow escape of manure from the animals into the pit;

the first floor portion forming a first sub-area of the containment area having a front edge, a rear edge and two side edges;

at least two remaining sub-areas of the containment area being formed by said second floor portion such that the two remaining sub areas each lie along a respective side edge of said first sub-area such that the two side edges of the first sub-area are spaced from adjacent side edges of the containment area;

the support members being formed of an electrically nonconductive material so as to provide electrical isolation of the first floor portion to prevent galvanic corrosion thereof.

2. The flooring apparatus according to claim 1 wherein the second floor portion includes at least one additional sub area each arranged along at least one of the front and rear edges of the first sub area.

3. The flooring apparatus according to claim 1 wherein the first floor portion is formed from a plurality of panels.

4. The flooring apparatus according to claim 3 wherein the first and second floor portions are formed from panels which are rectangular and of the same width.

5. The flooring apparatus according to claim 4 wherein the panels of the first floor portion have upper surfaces thereof at a raised height relative to the panels of the second floor portion.

6. The flooring apparatus according to claim 5 wherein the first panels each have an edge flange inclined downwardly onto the upper surface of the second panels, the flange having downwardly extending tabs for engaging into openings in the second panels to interlock at edges thereof to form an integral floor.

7. The flooring apparatus according to claim 4 wherein the support members include a plurality of beams and a plurality of cross webs arranged in parallel, spaced relation substantially at right angles to the beams with the first and second panels being supported on the cross webs.

8. The flooring apparatus according to claim 7 wherein the first panels each include at each end a cooperating pair of interlocking web engagement members extending outwardly to a respective side of the panel for engaging a top of a respective one of the cross webs for communicating weight from the first panels to the cross webs.

9. A flooring apparatus for a farrowing containment area for animals, the containment area having two side edges, a front edge and a rear edge and being located over a manure containment pit, the apparatus comprising:

a plurality of support members for extending over the manure containment pit;

a first floor portion which is formed from a material selected from the group consisting of aluminum, magnesium, zinc and alloys thereof;

a second floor portion which is formed of a plastics material which is electrically non-conductive;

at least part of the first floor portion having an upper surface which is apertured to allow escape of manure from the animals into the pit;

the first floor portion forming a first sub-area of the containment area having a front edge, a rear edge and two side edges;

said second floor portion forming sub areas each of which lies along a respective one of the front, rear and side edges of said first sub-area such that the front, rear and side edges of the first sub-area are spaced from adjacent side edges of the containment area so as to form an island which is spaced from each of the front, rear and side edges of the containment area by the second floor portion and which is electrically isolated from the front, rear and side edges of the containment area by the second floor portion;

and the first floor portion being supported relative to the second floor portion and the support members such that the first floor portion is electrically isolated from any other electrically conductive element forming part of or associated with the flooring apparatus to prevent galvanic corrosion thereof.

10. The flooring apparatus according to claim 9 wherein the second floor portion is formed from a plurality of panels.

11. The flooring apparatus according to claim 10 wherein the first and second floor portions are formed from panels which are rectangular and of the same width.

12. The flooring apparatus according to claim 11 wherein the panels of the first floor portion have upper surfaces thereof at a raised height relative to the panels of the second floor portion.

13. The flooring apparatus according to claim 12 wherein the first panels each have an edge flange inclined downwardly onto the upper surface of the second panels, the flange having downwardly extending tabs for engaging into openings in the second panels to interlock at edges thereof to form an integral floor.

14. The flooring apparatus according to claim 11 wherein the support members include a plurality of beams and a plurality of cross webs arranged in parallel, spaced relation substantially at right angles to the beams with the first and second panels being supported on the cross webs.

15. The flooring apparatus according to claim 14 wherein the first panels each include at each end a cooperating pair of interlocking web engagement members extending outwardly to a respective side of the panel for engaging a top of a respective one of the cross webs for communicating weight from the first panels to the cross webs.

16. A flooring apparatus for a farrowing containment area for animals, the containment area having two side edges, a front edge and a rear edge and being located over a manure containment pit, the apparatus comprising:

a plurality of support members for extending over the manure containment pit;

a first floor portion which is formed from a material selected from the group consisting of aluminum, magnesium, zinc and alloys thereof;

at least part of the first floor portion having an upper surface which is apertured to allow escape of manure from the animals into the pit;

the first floor portion forming a first sub-area of the containment area having a front edge, a rear edge and two side edges;

the first floor portion comprising at least one rigid panel defined by a plurality of cross beams at spaced positions along a length of the panel and a plurality of extruded members extending longitudinally of the panel at right angles to the cross beams and attached thereto, the extruded members being parallel and spaced each from the next to leave openings therebetween, the cross beams and the extruded members being formed from said material;

a second floor portion which is formed of a plastics material which is electrically non-conductive;

at least two remaining sub-areas of the containment area being formed by said second floor portion such that the two remaining sub areas each lie along a respective side edge of said first sub-area such that the two side edges of the first sub-area are spaced from adjacent side edges of the containment area;

the support members being formed of an electrically non-conductive material so as to provide electrical isolation of the first floor portion to prevent galvanic corrosion thereof.

17. The flooring apparatus according to claim 16 wherein said at least one panel comprises a single panel defining the whole of the first floor portion.

18. The flooring apparatus according to claim 16 wherein said extruded members are welded to the cross beams.

19. The flooring apparatus according to claim 16 wherein the extruded members are generally triangular in cross-section with a generally horizontal upper surface and two sides converging downwardly and inwardly to a bottom apex underneath the top surface.

20. The flooring apparatus according to claim 16 wherein the extruded members are arranged alternately such that alternate ones thereof have an upper surface thereof at a raised height and a lowered height.

21. The flooring apparatus according to claim 16 wherein the cross beams each comprise a flat web standing in a vertical plane with a series of recesses in an upper edge thereof at spaced positions thereacross such that each extruded member is received in a respective one of the recesses.

22. The flooring apparatus according to claim 21 wherein the recesses are arranged such that an upper surface of each extruded member is no higher than the upper edge of the web.

23. The flooring apparatus according to claim 22 wherein there is provided a welded bead across the upper edge of the web and over the upper surface of each extruded member in turn.

24. The flooring apparatus according to claim 16 wherein the extruded members are hollow so as to define a tubular duct along the length thereof.

25. The flooring apparatus according to claim 24 wherein there is provided a source of cooling fluid for passing along the tubular ducts of the extruded members for cooling the first floor portion.

26. The flooring apparatus according to claim 25 including a heat pump for extracting heat from the cooling fluid for cooling the fluid and a heat transfer member for receiving the heat from the heat pump for transferring the heat to the second floor portion.

27. The flooring apparatus according to claim 26 wherein the heat transfer member comprises a radiator plate covering a part of the second floor portion.

28. A flooring apparatus for a farrowing containment area for animals, the containment area having two side edges, a front edge and a rear edge and being located over a manure containment pit, the apparatus comprising:

a plurality of support members for extending over the manure containment pit;

a first floor portion forming a first sub-area of the containment area;

the first floor portion comprising at least one rigid panel defined by a plurality of cross beams at spaced positions along a length of the panel and a plurality of elongate tubular members extending longitudinally of the panel at right angles to the cross beams and attached thereto, the elongate tubular members being parallel and spaced each from the next to leave openings therebetween;

a second floor portion defining at least two remaining subareas of the containment area such that the two remaining sub areas each lie along a respective side edge of said first sub-area such that the two side edges of the first sub-area are spaced from adjacent side edges of the containment area;

the elongate tubular members being hollow so as to define a tubular duct along the length thereof;

a source of cooling fluid for passing along the tubular ducts of the extruded members for cooling the first floor portion;

a heat pump for extracting heat from the cooling fluid for cooling the fluid;

and a heat transfer member for receiving the heat from the heat pump for transferring the heat to the second floor portion.

29. The flooring apparatus according to claim 28 wherein the heat transfer member comprises a radiator plate covering a part of the second floor portion for communicating heat thereto.

* * * * *